July 9, 1957     E. A. ARP     2,798,326
MOUNTING FOR FILM
Filed Oct. 13, 1953     2 Sheets-Sheet 1
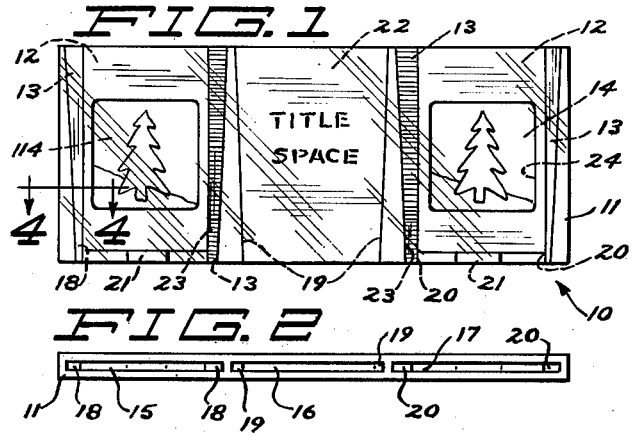
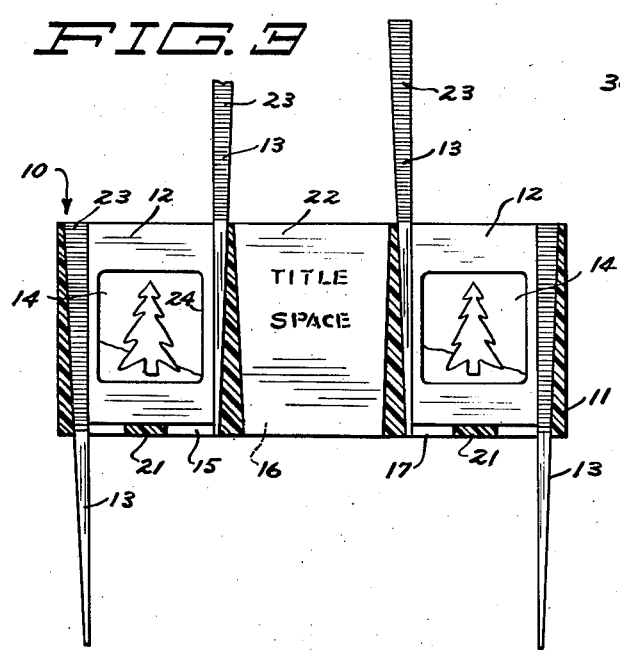
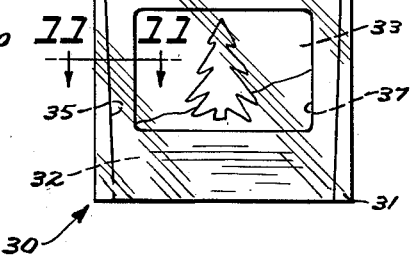
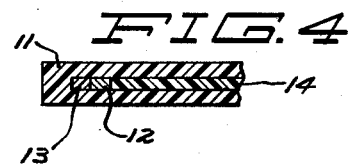
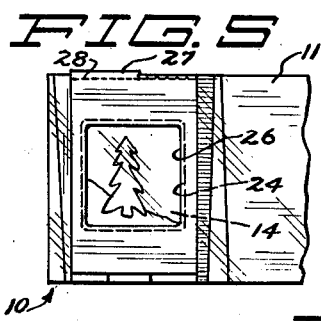
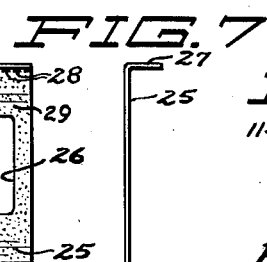
INVENTOR.
*EWALD A. ARP*
BY
*Braddock and Braddock*
ATTORNEYS

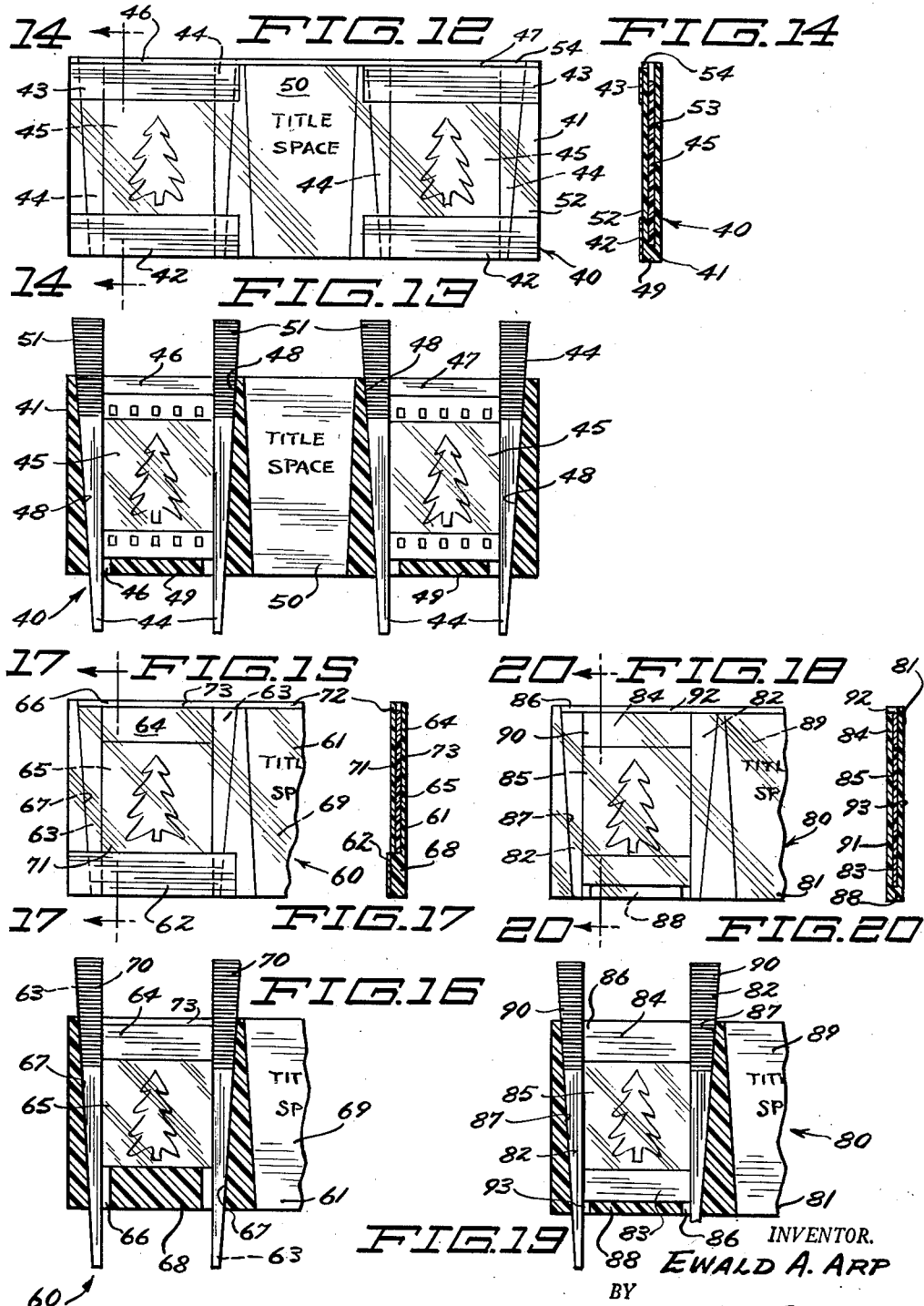

2,798,326
Patented July 9, 1957

2,798,326
MOUNTING FOR FILM

Ewald A. Arp, Minneapolis, Minn.

Application October 13, 1953, Serial No. 385,747

11 Claims. (Cl. 40—152)

This application is a continuation-in-part of the application of Ewald A. Arp, Serial No. 316,749, filed October 24, 1952.

This invention has relation to mountings for film for use in a film viewer or projector. A device made according to the present invention includes a flat, slotted, transparent film holder, and means including wedges to fix the position of a film to be viewed inside a slot of the holder.

In the accompanying drawings which form a part of this specification,

Figure 1 is a front elevational view of a mounting for film made according to a first form of the present invention;

Fig. 2 is a top end view of a film holder of the device with frames, wedges, and film removed;

Fig. 3 is a front elevational view of the device as seen in Fig. 1 with a forward wall of the film holder broken away showing wedges, frame, and film for viewing in place;

Fig. 4 is an enlarged, horizontal sectional view taken on the line 4—4 in Fig. 1;

Fig. 5 is a fragmentary, front elevational view of the mounting with a film mask in place;

Fig. 6 is a front elevational view of the film mask;

Fig. 7 is a side elevational view of the mask;

Fig. 8 is an enlarged, fragmentary top end view of the mounting with a film mask in place and with parts in full and parts broken away;

Fig. 9 is a front elevational view of a second form of the invention;

Fig. 10 is a top plan view of a film holder of the second form of the invention with the frame and the film to be viewed removed therefrom;

Fig. 11 is an enlarged, horizontal sectional view taken on the line 11—11 in Fig. 9;

Fig. 12 is a front elevational view of a third form of the invention;

Fig. 13 is a front elevational view of the device as seen in Fig. 12 with a forward wall of the film holder broken away and showing wedges, and film for viewing in place;

Fig. 14 is a horizontal sectional view taken on the line 14—14 in Fig. 12;

Fig. 15 is a fragmentary front elevational view of a fourth form of the invention;

Fig. 16 is a fragmentary front elevational view of the device of Fig. 15 with a forward wall of the film holder broken away;

Fig. 17 is a vertical sectional view taken on the line 17—17 in Fig. 15;

Fig. 18 is a front elevational view of a fifth form of the invention;

Fig. 19 is a front elevational view of the device of Fig. 18 with a forward wall of the film holder broken away; and Fig. 20 is a vertical sectional view taken on the line 20—20 in Fig. 18.

Referring to Figs. 1 thru 8, in a first form of the invention, a mounting for film 10 includes a flat, slotted, transparent film holder 11, opaque film framing members 12, and positioning wedges 13. The film which is being mounted is denoted 14. Three vertical slots 15, 16 and 17 through the film holder 11 have sides thereof tapering inwardly from top to bottom denoted 18, 19 and 20 respectively. A lug 21 extends across a portion of the bottom of slots 15 and 17. The film framing members 12 are rectangular in shape and are adapted to fit into the slots 15 and 17. Wedges 13 are tapered so that when a pair of wedges are inserted in the slot 15 or the slot 17 on both sides of a film framing member or frame 12, the sides of the wedges toward the frame will form a vertical guide therefor. Each of the identical film framing members 12 has an opening 24 therein of exactly the size of the film which is being mounted therein.

A title card 22 is adapted to fit into the slot 16 and is shaped to have a bottom edge and a top edge thereof flush with the bottom and top of the film holder 11 and the side edges tapered to be in contact with tapered sides 19 of the slot.

The thickness of the title card and the film framing members is approximately the same as the width of the slots 15, 16 and 17.

A series of calibrations 23 are inscribed on each of the positioning wedges 13.

To be prepared for mounting, the film containing the image to be viewed or projected is cut to the shape as seen in Figs. 1 and 3. Since, as will be pointed out, the lateral positioning of the film images in the mounting is of great importance, this trimming of the film must be accomplished with great care. One way to get accurately cut pictures would be to employ a die keyed to the film strip perforations for doing the cutting.

The cut film containing the image to be projected or viewed is inserted in the opening 24 of the frame 12. The frame and film are then inserted into slot 15 or slot 17 and the film is thus held in place in the holder by the frame. It is obvious that dust and dirt can not now mar the surface of the film nor can the film surface become scratched.

Title information concerning the particular pair of views in the slots of the film holder can be inscribed by hand on title card 22 and this card can then be inserted in the slot 16 to provide a protected permanent place for retaining this information in an easily readable form.

The mounting for film 10 is designed for use with stereopticon pictures. These pictures are taken by cameras which are mounted at fixed distances from each other. When viewed or projected with the proper equipment, each of the observer's eyes will see only one of the pictures and a three dimensional effect is thus obtained. In projecting these pictures upon a screen for viewing, polaroid lenses are employed in a pair of projectors having the distance between the center of the lenses equal to the distance between the center of the lenses in the cameras taking the pictures. By wearing polaroid glasses, the observer can view each of the two images projected on the screen with a different eye and the three dimensional effect is created.

Scenes pictured by stereopticon slides can cover pictures having a farthest point at infinity or at a great distance (pictures including mountains or clouds) or they can cover scenes having relatively close "far points" (scenes taken inside of small rooms). In viewing a stereopticon pair of pictures, the eyes of the observer attempt to adjust so that the image as seen by one eye at the "far point" of the picture appears to be exactly superimposed on the same image as seen by the other eye. It is often impossible or at least difficult and uncomfortable for the eye to make this adjustment as slides having "far points" at varying distances are projected in turn. It is, therefore, essential that the pictures as projected or viewed are moved with respect to each other to produce this desired alignment when they are projected or viewed. The projected or viewed pair of images of a scene having a relatively close "far point" will have to be spaced farther apart than the projected pair of images of a scene having a "far point" at a greater distance.

One means of making this adjustment is to change the center line distance between the projector lenses as each new slide is put into the machine to cause the images to be properly related. This solution has proved unsatisfactory, however, since it necessitates an adjustment at the projector for every slide and since this moving of the images by adjusting the lenses while the observer is watching causes an uncomfortable and unpleasant sensation in the mind of the observer. A strain on the eyes also results.

The present invention provides a more satisfactory solution. A mounting for film made according to the present invention provides for the lateral adjustment of the images on the film so that the distance between the center lines of the films will be inversely proportional to the distance between the camera and the "far point" of the picture. When the frames 12 and the films 14 have been inserted in the slots 14 and 17, wedges 13 are inserted in the sides of the slots nearest the center of the film holder 11. With the inner wedges 13 in position as seen in Fig. 3, a pair of wedges 13 are inserted along the outside of the frames in the slots 15 and 17 and are moved through the slots until the frames 12 are forced against the inner wedges 13. The frames and film are now positioned nearest the center of the film holder 11. This is the proper arrangement for projecting or viewing pictures that have an extremely distant or infinitely distant "far point." When the films and frames are so positioned, the wedges can be cut off flush with the top and bottom of the holder.

In the event that the views to be projected do not have a "far point" at a very great distance, it is desirable to space the films at a greater distance from each other. This distance is an inverse function of the distance between the camera taking the picture and the "far point" of the picture. For this purpose, a series of calibrations 23 are provided on each of the wedges 13. With the frames, films, and the two inner wedges 13 in position as seen in Fig. 3 and before the two outer wedges are put into the slots, the inner wedges are slid farther into the slots 15 and 17. Each of the calibrations 23 represent a different distance between the camera and the "far point" of the picture so that the inner wedges can be inserted until the proper calibration is aligned with the top edge of the film holder 11. With the inner wedges in that position, the outer wedges are forced into the slot until they cause the frames 12 to be firmly placed in the slots and against the inner wedges 13. The top and bottom of each of the wedges can then be clipped off.

Films mounted for proper projection as above described are also properly mounted for best use in a film viewer. The parts are positioned in Fig. 1 for viewing a scene having a relatively close "far point" either in a stereopticon film viewer or by using a steropticon slide projector.

When either projected or viewed, these film pairs give the effect of seeing the three dimensional picture through a window frame or picture frame. In the case of pictures taken at very close range, the objects in the foreground of the picture may appear to be between the observer and this frame through which the observer is apparently viewing the picture. This sometimes causes an undesirable effect in the mind of the observer. In order to make the objects in the foreground of the view appear to be behind the "viewing window," it is necessary that the size of the picture be cut down by the use of a smaller mask around the picture. A mask 25 is constituted as a stiff, thin, opaque sheet having an opening 26 therein of smaller size than the film 14 or opening 24 in the frame 12. A lip 27 extends at right angles to the body of the mask 25 and the mask is perforated along a line 28 parallel to and adjacent said lip. An adhesive 29 covers one surface of the mask from line 28 to the bottom thereof.

After the films have been properly positioned with respect to each other, the mounting 10 is placed in a viewer or projector and a mask 25 is slid down to cover one face of the film holder with adhesive 29 in contact with the holder and with the lip 27 resting on the top surface thereof. The lateral position of the mask is adjusted by sliding the lip 27 along the top of the holder until the desired portion of one of the films is exposed to view. The lip 27 and the film holder 11 are held in fixed relation to each other and removed from the projector. The adhesive 29 is moistened and the mask is pressed against the holder to permanently mount it with respect thereto. The lip is torn off along the line 28. Another mask 25 is similarly mounted with respect to the other film in the holder.

The lug 21 across the bottom of the film holder 11 in each of the slots 15 and 17 limits the movements of the frame 12 in downward direction and provides for the proper vertical alignment thereof.

In projecting or viewing scenes filmed using conventional cameras, it is unnecessary to provide for variable lateral spacing of the film with respect to the mounting. In Figs. 9, 10, and 11 a second form of the invention shows a film mounting adapted for this use. A mounting for film 30 includes a flat, transparent film holder 31 and a frame or film framing member 32. The film is designated 33. A slot 34 passes vertically through the film holder 31 and is provided with sides 35 which taper inwardly from top to bottom thereof. Frame 32 has tapered sides and is of dimension to fit exactly inside of slot 34.

In order to prepare the film for mounting, it is cut from the developed film strip as it is received from the processor in such size and shape that it will exactly fill an opening 37 in the frame 32. The film is placed in this opening 37 and both the film and the frame are slid into the position as indicated in Fig. 9. The frame is of thickness to fill the slot 34 and is of an opaque material. The title information for the picture can be written on the frame before it is placed in the slot.

In a third form of the invention, disclosed in Figs. 12, 13 and 14, a mounting for film 40 includes a flat, transparent film holder 41, lower opaque veneer 42, upper opaque veneer 43, and positioning wedges 44. The film which is being mounted is denoted 45. Vertical slots 46 and 47 extend through the film holder 41 and have sides which taper inwardly from top to bottom denoted 48, 48. A lug 49 extends across a portion of the bottom of each of the slots 46 and 47.

Wedges 44 are tapered so that when a pair of wedges are inserted in the slot 46 or the slot 47 to be in contiguous relationship to the tapering sides 48, 48 thereof, the sides of the wedges spaced from the tapering sides 48, 48 will form a vertical guide.

A title card 50 fits into the film holder 41 in the same manner as explained in connection with the first form of the invention.

A series of calibrations 51 are inscribed on each of the positioning wedges 44. The thickness of the title card and the film positioning wedges is approximately the same as the width of the slots 46 and 47.

A forward wall 52 is cut away as at 54 to provide a convenient place to put an end of a film to be mounted against a rearward wall 52 preparatory to inserting said film into slot 46 or slot 47. Before being inserted into its slot, a first film of a stereopticon pair to be viewed or projected is cut to shape as seen in Fig. 13. This cut film is inserted in slot 46 so that the bottom edge thereof is in contact with the lug 49. The positioning wedges 44, 44 are inserted one on either side of the film to have position between the film and the tapering sides 48 of the slot.

Through the use of the calibrations 51 on the positioning wedges, the lateral position of the film to be viewed is adjusted and fixed as explained in connection with the first form of the invention.

Positioning wedges 44, 44 are of opaque material and serve to form a frame or mask for the film to be viewed at the sides thereof. Lower opaque veneer 42 is positioned in such a manner that it serves as a frame or mask along the bottom edge of that portion of the film which is to be viewed when the film is in contact with the lug 49, and upper opaque veneer 43 is so positioned that it masks the top edge of the film and frames the top portion of the film which is to be viewed.

A second film of the stereopticon pair can be positioned in the vertical slot 47 in the same manner as the first of the pair was positioned in the slot 46.

In the fourth form of the invention, disclosed in Figs. 15, 16 and 17, a mounting for film 60 includes a flat, transparent film holder 61, lower opaque veneer 62, positioning wedges 63 and upper opaque spacer 64. The film which is being mounted is denoted 65. A pair of vertical slots 66, 66 extend through the film holder 61 and have sides which taper inwardly from top to bottom denoted 67. The construction of each of the vertical slots 66 is identical with that of the other slot and only one of them is shown in the drawings. A lug 68 extends across a bottom portion of each of slots 66, 66.

Wedges 63, 63 are tapered so that when a pair of them are inserted into a slot 66 to be in contiguous relationship with the tapered sides 67, 67 thereof, the sides of the wedges spaced from the tapering sides 67, 67 will form a vertical guide.

A title card 69 fits into the film holder 61 in the same manner as explained in connection with the first form of the invention.

A series of calibrations 70 are inscribed on each of the positioning wedges. The thickness of the title card and the film positioning wedges is approximately the same as the width of the slots 66, 66.

A forward wall 71 of the film holder 61 is cut away as at 72, and a rearward wall 73 extends above the forward wall at that point.

To prepare a first film of a stereopticon pair to be mounted, the film is cut to shape as seen in Fig. 16. This cut film is inserted into a slot 66 so that a bottom edge thereof is in contact with the lug 68. The positioning wedges 63, 63 are inserted one on either side of the film 65 to have position between the film and the tapering sides 67 of the slot. Upper opaque spacer 64 is inserted into the slot on top of the film 65 and between the wedges 63, 63. This spacer has lateral dimension slightly greater than that of the film to be viewed. Through the use of the calibrations 70 on the positioning wedges, the lateral position of the film is adjusted and fixed as explained in connection with the first form of the invention. Since the spacer 64 is greater in lateral dimension than the film, the wedges, when firmly in position to fix the lateral position of the film, will bear against the spacer and will not put pressure against the edges of the film 65.

Positioning wedges 63, 63 are of opaque material and serve to form a frame or mask for the film to be viewed at the sides thereof. Lower opaque veneer 62 is positioned in such a manner that it serves as a frame or mask along the bottom edge of that portion of the film which is to be viewed when the film is in contact with the lug 68. Upper opaque spacer 64 forms a mask or frame along the upper edge of the film to be viewed and serves to complete the four sided frame. It is the same thickness as the film 65.

A second film of the stereopticon pair can be positioned in a second vertical slot 66 of the film holder in the same manner as the first of the pair was positioned.

In a fifth form of the invention, disclosed in Figs. 18, 19 and 20, a mounting for film 80 includes a flat, transparent film holder 81, positioned wedges 82, lower opaque spacer 83, and upper opaque spacer 84. The film which is being mounted is denoted 85. A pair of vertical slots 86, 86 extend through the film holder 81 and have sides which taper inwardly from top to bottom denoted 87, 87. The construction of each of the vertical slots 86 is identical with that of the other slot and only one of them is shown in the drawings. A lug 88 extends across the bottom portion of each of the slots 86, 86.

Wedges 82, 82 are tapered so that when a pair of them are inserted into a slot 86 to be in contiguous relation to the sides 87, 87 thereof, the sides of the wedges spaced from the tapering sides 87 will form a vertical guide.

A title card 89 fits into the film holder 81 in the same manner as explained in connection with the first form of the invention.

A series of calibrations 90 are inscribed in each of the positioning wedges. The thickness of the title card and of the film positioning wedges is approximately the same as the width of the slots 86, 86.

A forward wall 91 is cut away as at 92, and a rearward wall 93 extends above the forward wall at that point. To prepare a first film of a stereopticon film pair to be mounted, the film is cut to shape as seen in Fig. 19. Lower opaque spacer 84 is inserted into the slot 86 to have position in contact with the lug 88, and positioning wedges 82, 82 are inserted one on either side of the lower spacer to have position between that spacer and the tapering sides 87, 87 of the slot. The cut film 85 is inserted between the vertical side walls of the positioning wedges 82, 82 to have position against the upper edge of the lower opaque spacer 82. Upper opaque spacer 84 is inserted into the slot on top of the film 85 and between the wedges 82, 82. Lower opaque spacer 83 and upper opaque spacer 84 have lateral dimension slightly greater than that of the film 85. Through the use of the calibrations 90 on the positioning wedges, the lateral position of the film is adjusted and fixed as explained in connection with the first form of the invention. Since the spacers 83 and 84 are greater in lateral dimension than the film 85, the wedges 82, 82, when firmly in position to fix the lateral position of the film 85, will bear against these spacers and will not put pressure against the edges of the film 85.

Positioning wedges 82, 82 are of opaque material and serve to form a frame or mask for the film to be viewed at the sides thereof. Lower opaque spacer 83 forms a mask or frame along the lower edge of the film while upper opaque spacer 84 forms a mask along the upper edge thereof. These spacers are of the same thickness as that of the film 85.

A second film of the steropticon pair can be positioned in a second vertical slot 86 of the film holder 81 in the same manner as the first of the pair was positioned.

What is claimed is:

1. A mounting for film including a transparent film holder having a pair of spaced apart vertical slots therethrough lying in a single plane, a lug extending into each of said slots at a bottom portion thereof, a separate pair of tapered wedges adapted to fit into each of said slots, each of said slots being of configuration to receive one of a pair of films to be viewed between said tapered wedges, said slots being spaced to constitute a stereoscopic mount, and at least one of said wedges in each slot being inscribed with a series of calibrations at right angles to the longitudinal axis thereof to indicate by relative position of said calibrations to said holder the horizontal spacing of the film to be viewed with respect to the holder.

2. A mounting for film including a transparent film holder having a pair of spaced apart, vertical slots therethrough lying in a single plane, a lug extending into each of said slots at a bottom portion thereof, a separate pair of tapered wedges adapted to fit into each of said slots, each of said slots being of configuration to receive one of a pair of films to be viewed between said tapered wedges, said slots being spaced to constitute a stereoscopic mount, and the horizontal positioning of each of the films with respect to the holder being indicated by the distance one of said tapered wedges adjacent said film extends into the slot receiving said film.

3. A mounting for film including a transparent film holder having a pair of spaced apart, vertical slots therethrough lying in a single plane, a lug extending into each of said slots at a bottom portion thereof, a separate pair of tapered wedges adapted to fit into each of said slots, each of said slots being adapted to receive one of a stereopticon pair of films to be viewed and a pair of tapered wedges each at an opposite side of said film, said slots being spaced to constitute a stereoscopic mount, an upper spacer adapted to fit into each of said slots on top of said film to be viewed, said spacer having horizontal dimension not less than the horizontal dimension of said film to be viewed, and at least one of each pair of wedges being inscribed with a series of calibrations at right angles to the longitudinal axis thereof to indicate by relative position of said calibrations to said holder the horizontal spacing of the film to be viewed with respect to the holder.

4. A mounting for film including a transparent film holder having a pair of vertical, spaced apart slots therethrough lying in a single plane, a separate pair of tapered wedges adapted to fit into a first of said slots, each of said slots being adapted to receive one of a stereopticon pair of films to be viewed, and each slot being adapted to receive said pair of tapered wedges each at an opposite side of said film, said slots being spaced to constitute a stereoscopic mount, an upper spacer adapted to fit into each slot on top of said film to be viewed, said spaced having horizontal dimension not less than the horizontal dimension of said film to be viewed, and the horizontal positioning of each of the films with respect to the holder being indicated by the distance a first wedge of each pair of wedges extends into said slot.

5. A mounting for film including a transparent film holder having a pair of spaced apart, vertical slots therethrough lying in a single plane, a separate pair of tapered wedges adapted to fit into each of said slots, a separate lower spacer adapted to fit into each slot between said pair of tapered wedges, said first slot being adapted to receive one of a stereoptican pair of films to be viewed between said pair of wedges and on top of said lower spacer, said slots being spaced to constitute a stereoscopic mount, an upper spacer adapted to fit into each slot on top of said film to be viewed, said upper and lower spacers having horizontal dimension not less than the horizontal dimension of the film to be viewed, and at least one each pair of said wedges being inscribed with a series of calibrations at right angles to the longitudinal axis thereof to indicate by relative position of said calibrations to said holder the horizontal spacing of the film to be viewed with respect to the holder.

6. A mounting for film including a film holder having front and rear parallel, flat, transparent walls and a plurality of side walls between said front and rear walls, said front and rear walls and two of said side walls providing the bounding surfaces for each of a pair of vertical slots extending through said holder, a pair of film frames adapted to enter said slots and each having an opening therein to receive a film to be viewed, the thickness of said film frames being equal the thickness of said film to be viewed, said front and rear walls of said film holder being spaced to lie in contiguous relation to said film frames and said films to be viewed, a separate pair of tapered wedges adapted to fit into each of said slots and between each of said frames and side walls adjacent said walls to fix the horizontal position of said frames relative to said holder and to retain said frames in said position, and at least one of each pair of said wedges being inscribed with a series of calibrations at right angles to the longitudinal axis thereof to indicate by relative position of said calibration to said holder the horizontal spacing of its adjacent frame with respect to the holder.

7. A mounting for film including a transparent film holder having a pair of spaced apart, vertical slots therethrough lying in a single plane, a lug extending into each of said slots at a bottom thereof, a separate pair of tapered wedges adapted to fit into a first of said slots, a pair of film frames each adapted to enter into one of said slots, said slots being spaced to constitute a stereoscopic mount, and at least one of said wedges being inscribed with a series of calibrations at right angles to the longitudinal axis thereof to indicate by relative position of said calibrations to said holder the horizontal spacing of its adjacent frame with respect to the holder.

8. A mounting for film including a transparent film holder having a pair of vertical, parallel, spaced apart slots therethrough and having a plurality of side walls, each of said slots being bounded by two of said side walls, a separate pair of frames adapted to receive films to be viewed of configuration to enter into said slots, a pair of tapered wedges adapted to fit into each said slots and between said frames and said side walls adjacent said frames to adjustably fix the horizontal position of said frames relative to said holder and to retain said frames in said position such that the distance which one of said wedges extends into one of said slots is directly proportional to the distance between an adjacent frame and the adjacent side wall.

9. A mounting for film including a transparent film holder having a pair of spaced apart vertical slots therethrough lying in a single plane, a lug extending into each of said slots at a bottom portion thereof, a pair of tapered wedges adapted to fit into a first of said slots, said first slot being of configuration to receive one of a pair of films to be viewed between said tapered wedges, said slots being spaced to constitute a stereoscopic mount, means for fixedly positioning a second of said pair of films to be viewed in a second of said slots, and at least one of said wedges being inscribed with a series of calibrations at right angles to the longitudinal axis thereof to indicate by relative position of said calibrations to said holder the horizontal spacing of each one of the pair of films to be viewed with respect to the other.

10. A mounting for film including a transparent film holder having a vertical slot therethrough, a lug extending into said slot at a bottom portion thereof, a pair of tapered wedges adapted to fit into said slot, and said slot being of configuration to receive a film to be viewed between said tapered wedges.

11. The combination as specified in claim 10, and at least one of said wedges being inscribed with a series of calibrations at right angles to the longitudinal axis thereof to indicate by relative position of said calibrations to said holder the horizontal spacing of the film to be viewed with respect to the holder.

References Cited in the file of this patent

UNITED STATES PATENTS

| | | |
|---|---|---|
| 138,967 | Warren | May 13, 1873 |
| 2,132,670 | Young | Oct. 11, 1938 |
| 2,287,624 | Langenfeld | June 23, 1942 |
| 2,532,776 | Linser | Dec. 5, 1950 |
| 2,572,735 | Kugel | Oct. 23, 1951 |
| 2,602,254 | Diekmann | July 8, 1952 |
| 2,656,631 | Cadwell | Oct. 27, 1953 |
| 2,736,975 | Grotthus | Mar. 6, 1956 |

FOREIGN PATENTS

| | | |
|---|---|---|
| 899,729 | France | June 8, 1945 |